United States Patent [19]
Denkowski et al.

[11] 3,851,538
[45] Dec. 3, 1974

[54] TORQUE SWITCH MECHANISM

[75] Inventors: Walter J. Denkowski; John Zouzoulas, both of King of Prussia, Pa.

[73] Assignee: Philadelphia Gear Corporation, King of Prussia, Pa.

[22] Filed: May 21, 1973

[21] Appl. No.: 362,424

[52] U.S. Cl. .............................. 74/425, 192/150
[51] Int. Cl. ............................................. F16h 1/16
[58] Field of Search ....................... 74/412 TA, 425

[56] References Cited
UNITED STATES PATENTS

| | | |
|---|---|---|
| 1,829,249 | 10/1931 | Beulwitz ................. 74/412 TA UX |
| 2,781,616 | 2/1957 | Estabrook................ 74/412 TA UX |
| 3,339,426 | 9/1967 | Borgrafe .................. 74/412 TA UX |

*Primary Examiner*—Leonard H. Gerin
*Attorney, Agent, or Firm*—Paul & Paul

[57] ABSTRACT

In a mechanism wherein a worm drives a worm gear, two sets of compression springs are pre-loaded substantially differently for restraining movement of the worm shaft in its axial direction. Each set of springs is adapted to actuate one or more switch mechanisms.

8 Claims, 6 Drawing Figures ns, and is applicable to the mechanism of FIG. 3.

TORQUE SWITCH MECHANISM

BACKGROUND OF THE INVENTION

This invention relates to a relatively wide variety of load-lifting or load-handling devices which are driven by a worm and worm gear. In such mechanisms, the torque load on the worm gear is transmitted to the worm as a reactive force in the axial direction of the worm shaft, and restraining means are usually provided for preventing axial movement of the worm in response to normal expected torque loads on the worm gear.

The present invention relates particularly to the provision, in such load-lifting or load-handling devices, of means responsive to the torque loads on the worm gear for mechanically actuating one or more electrical switches to accomplish one or more desirable results, such as shutting off the power to the driving motor when the torque load exceeds a pre-selected value.

In U.S. Pat. No. 3,523,599, issued Aug. 11, 1970 to Walter J. Denkowski, adjustable compression springs are provided for restraining the axial reaction movement of the worm. The provision of adjustable compression springs allows the valve operators or screw jacks, or other mechanisms which are driven by the worm, to accommodate for different loads. There are, however, limits to the adjustment range of the mechanism shown in the aforesaid U.S. Pat. No. 3,523,599, and such mechanism is not suitable for situations where it is desired to actuate one or more switch mechanisms in response to different torque loads which are widely different from each other.

SUMMARY OF THE INVENTION

A principal object of the present invention is to provide, in a load-lifting or load-handling device driven by a worm and worm gear, means responsive to the axial load on the worm shaft, resulting from the torque load on the worm gear, for mechanically operating electrical switches in response to an increase in load over a first range of relatively light loads, and also to an increase in load over a second range of relatively heavy loads.

The foregoing object is achieved by providing two sets of pre-loaded compression springs, one set being pre-loaded to a value within a range of relatively light values and the other set pre-loaded to a value within a range of relatively heavy values.

DETAILED DESCRIPTION OF THE PREFERRED EMBODIMENTS

Figure 1:
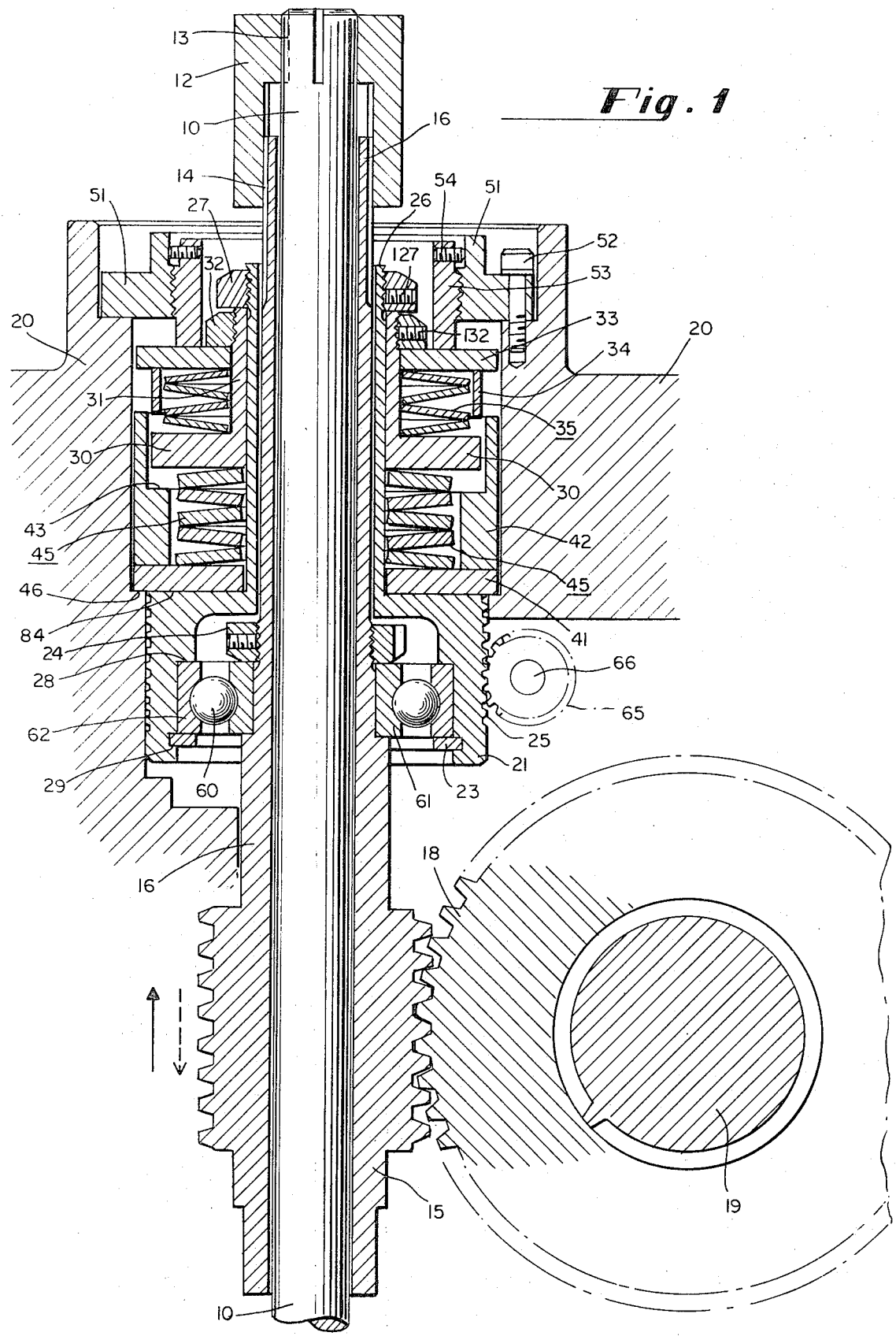
FIG. 1 is a view, in section, of one form of restraining mechanism according to the present invention.

Referring now to FIG. 1, a worm 15 on a worm shaft 10 drives a worm gear and nut 18. Nut 18 is keyed or otherwise secured to a load stem 19. Worm 15 is illustrated as being driven by the worm shaft 10 through a coupling 12 which is shown splined to the end of the shaft 10, as at 13, and is also splined, as at 14, to an elongated portion 16 which is an integral part of the worm 15. It is to be understood that the form of coupling shown in FIG. 1 is merely illustrative, and that so far as the present invention is concerned, the worm 15 may be splined directly or otherwise keyed to the worm shaft 10 by any suitable means allowing for limited axial movement of the worm 15 on the shaft 10.

Figure 4:
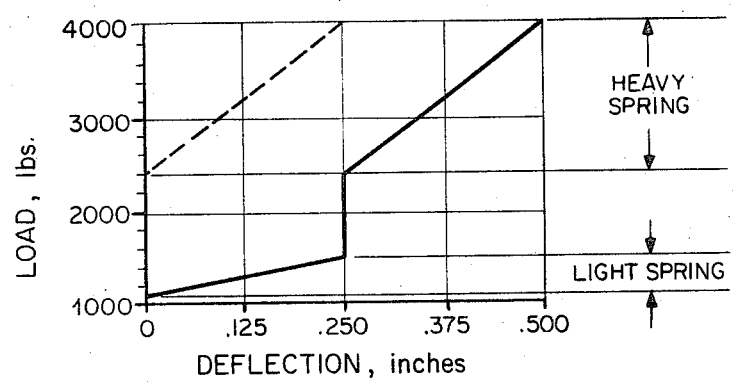
FIG. 4 is a set of curves illustrating the relationship between axial load and deflection of the restraining means. This set of curves is applicable to the restraining mechanism of FIG. 1.

When worm 15 drives nut 18 and its output shaft or stem 19, the torque load on stem 19 and nut 18 sets up a reactive load on worm 15 in the axial direction of worm shaft 10. Axial movement of worm 15 is prevented, under loads of preselected magnitude, by restraining means which, in FIG. 1, and according to the present invention, consist of two sets of compression springs 35 and 45, as will be described. Both sets of springs 35 and 45 are illustrated as consisting of sets of dished washers. The one set 35 is relatively light and, illustrated in FIG. 4, is pre-loaded to begin deflection at 1,000 lbs. of axial thrust and to deflect through 0.250 inch (short of straightening) at 1,500 lbs. The other set 45 is relatively heavy, and, as illustrated in FIG. 4, is pre-loaded to begin deflection at 2,500 lbs. of axial thrust and to deflect through 0.250 inch at 4,000 lbs., a total deflection of 0.5 inch for the two sets of springs. The values just given are, of course, merely illustrative and not limiting. Other values may be used, so far as the invention is concerned.

Referring again to FIG. 1, when the worm drive shaft 10 is being rotated in a clockwise direction as viewed from the bottom of FIG. 1, the axial thrust transmitted to the worm 15 is assumed upward, in the direction indicated by the solid-line arrow in FIG. 1. When the drive shaft 10 is being rotated in the counter-clockwise direction the axial thrust on worm 15 is downward, in the direction of the dashed-line arrow in FIG. 1.

Consider now the situation when the axial thrust on worm 15 is upward, in the direction of the solid-line arrow. The restraining mechanism, which includes the two sets of dished-washer springs 35 and 45 will not permit axial movement of worm 15 until the axial thrust reaches 1,000 lbs., in the present example. Thereafter, as the thrust increases, the light spring 35 will begin to compress. The axial thrust from the worm 15 may be traced to the set of light springs 35 as follows. The worm 15 has a worm sleeve portion 16 which applies an upward thrust force against the inner race 61 of the bearing assembly 60, and then through the bearing assembly to the outer race 62, which applies the thrust force against a shoulder 28 of a cartridge 21. Cartridge 21 is T-shaped, as viewed in cross-section, and has an elongated reduced-diameter sleeve portion 26 which is concentric with the worm sleeve 16. Surrounding the sleeve portion 26 and supported on a shoulder 84 of the cartridge 21 is an annular retainer 41 which functions to retain one end of the set of heavy springs 45. The thrust on cartridge 21 is applied through retainer 41 and the set of heavy springs 45 to a retainer 30 which functions to retain one end of the set of light springs 35. It is assumed that at this time the thrust force is less than that required to compress the heavy springs 45. The thrust thus applied through the undeflected heavy springs 45 to the light-spring retainer 30 is applied to the set of light springs 35 the opposite end of which is held axially fixed by a retainer 33 which abuts against the end of a nut 53 which is adjustably positioned in a collar 51 secured, as by bolts 52, to the frame or housing 20. In the present illustration, until the axial thrust reaches 1,000 lbs. the set of light springs 35 resists deflection and movement of cartridge 21 in the axial direction is prevented. Above 1,000 lbs., the light springs 35 deflect, and retainer 30 moves toward retainer 33. This movement continues, in response to increased thrust forces, until retainer 30 has moved 0.250 inch, at which time retainer 30 abuts against annular stop 34 which projects from retainer 33.

After the set of light springs 35 has been deflected to the extent permitted by the stop 34 (one-quarter inch in the present example) further axial movement of worm 15 is prevented, in the present example, until the thrust force reaches 2,500 lbs., after which the set of heavy springs 45 begins to deflect. The extent of compression permitted for the set of heavy springs 45 is determined by the distance between a shoulder 43 of an annular stop member 42 which is pushed by retainer 41 and the face of the retainer 30 against which the shoulder 43 will abut. In the present example, this spacing is assumed to be one-quarter inch (0.250 inch), and, as indicated in FIG. 4, it is assumed, in the present illustration, that a thrust load of 4,000 lbs. is required to deflect the set of heavy springs 45 through 0.250 inch. It will be understood that when further deflection of the heavy springs 45, and also of the light springs 35, is prevented by the stop members 30 and 34, respectively, the dished-washers are still somewhat dished. Full straightening of the dished-washers is not desired.

Cartridge 21 is provided with a toothed peripheral surface 25 so that when the cartridge 21 moves axially, in response to the thrust forces, as just described, a gear 65, which is in mesh with surface 25 and which is keyed or otherwise secured to a shaft 66, moves rotationally. While not illustrated, shaft 66 may actuate one or more electrical switches, as desired. For example, one or more switches may be operated in response to the first one-quarter-inch movement of cartridge 21, to open or close electrical circuitry as desired, and one or more other switches may be operated in response to the second one-quarter-inch movement of the cartridge 21.

It will be seen from the foregoing description that the first one-quarter-inch axial movement of cartridge 21 is in response to thrust forces in the 1,000–1,500 lbs. range, while the second one-quarter-inch movement is in response to thrust forces in the 2,500–4,000 lbs. range. Adjustment of the pre-load conditions of the two sets of springs 35 and 45 is made by adjustment of nuts 27 and/or 32, and adjustment of nut 53. The latter is held in place in collar 51 by a set screw 54. Tightening of nut 27 increases the pre-load condition of heavy springs 45. Tightening up on nut 27 and adjusting nut 53 increases the pre-load on the light springs 35. Nuts 27 and 32, following adjustment, are held in place against rotational displacement, by set screws 127 and 132, respectively.

We have just described how the restraining mechanism of FIG. 1 functions when the worm drive shaft 10 is being driven rotationally in a clockwise direction, as viewed looking upwardly from the bottom of FIG. 1. If the worm drive shaft 10 is being operated in the counter-clockwise direction the axial thrust on worm 15 is in the direction indicated by the dashed-line arrow. In this direction, the set of light springs 35 are ineffective and worm 15 is restrained from axial movement until the torque load on output nut 18 is such that the axial thrust load on worm 15 exceeds, in the present example, 2,500 lbs. This is depicted graphically in FIG. 4 wherein the dashed-line represents graphically the operation of the mechanism of FIG. 1 when the axial thrust on the worm 15 is in the direction indicated by the dashed-line arrow in FIG. 1. The fact that the set of light springs 35 is ineffective when the axial thrust on the worm is in the direction of the dashed-line arrow in FIG. 1, will be seen from the following: The axial thrust on worm 15 is transmitted to cartridge 21 through the nut 24, the inner race 61 of the bearing assembly 60, the outer race 62 of the bearing assembly, the retainer 23, and the shoulder 29 of the cartridge 21. This thrust is transmitted through sleeve portion 26 of the cartridge to nut 27 and through nut 27 to the leg 31 of the retainer 30 of the set of light springs 35. This thrust is then applied by the head of the retainer 30 to the set of heavy springs 45. Since the annular retainer 41 at the other end of the set of heavy springs 45 is prevented from moving axially by the shoulder 46 in the housing 20 it will be seen that the axial thrust on worm 15 in the dashed-line-arrow direction, just described, is applied only to the set of heavy springs 45. In the present example, the set of heavy springs 45 has been so selected and so pre-loaded that deflection does not take place until the thrust load thereon equals 2,500 lbs., as indicated graphically in FIG. 4. When, in the present example, the thrust load on the set of heavy springs 45 increases to 4,000 lbs., a deflection of one-quarter inch (0.250 inch) occurs which brings the surface of the head of the retainer 30 into abutment with the shoulder 43 of the stop member 42. Further movement of the cartridge 21 and of worm 15 is then prevented. It will be noted that when the set of heavy springs is deflected, as just described, both of the retainers 30 and 33 of the set of light springs 35 move together in similar manner so that no deflection change takes place.

Figure 2:
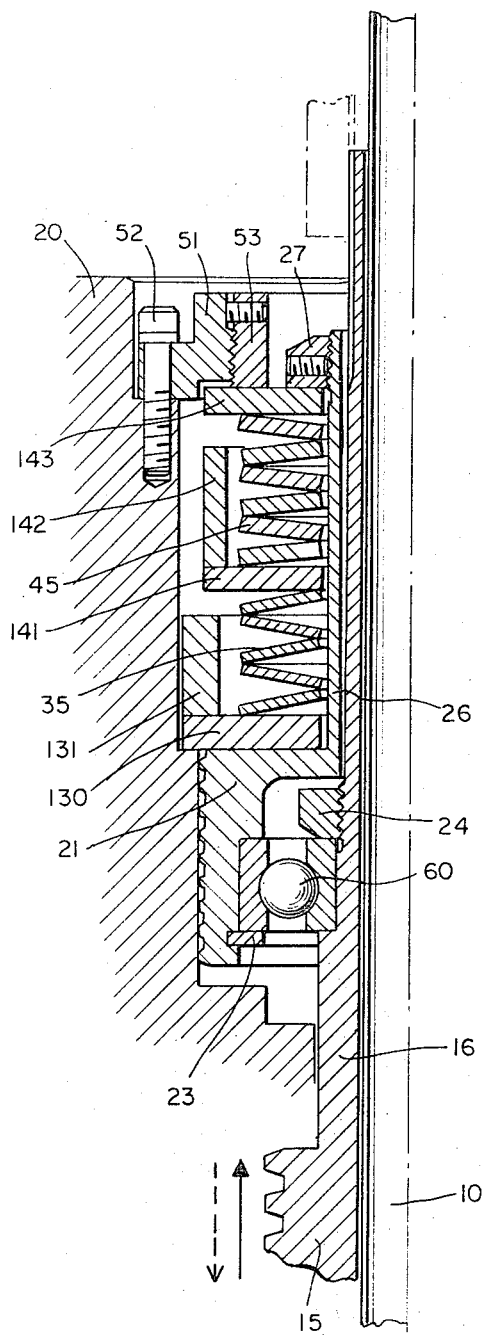
FIG. 2 is a view, in section, of another form of restraining mechanism embodying the present invention.
Figure 3:
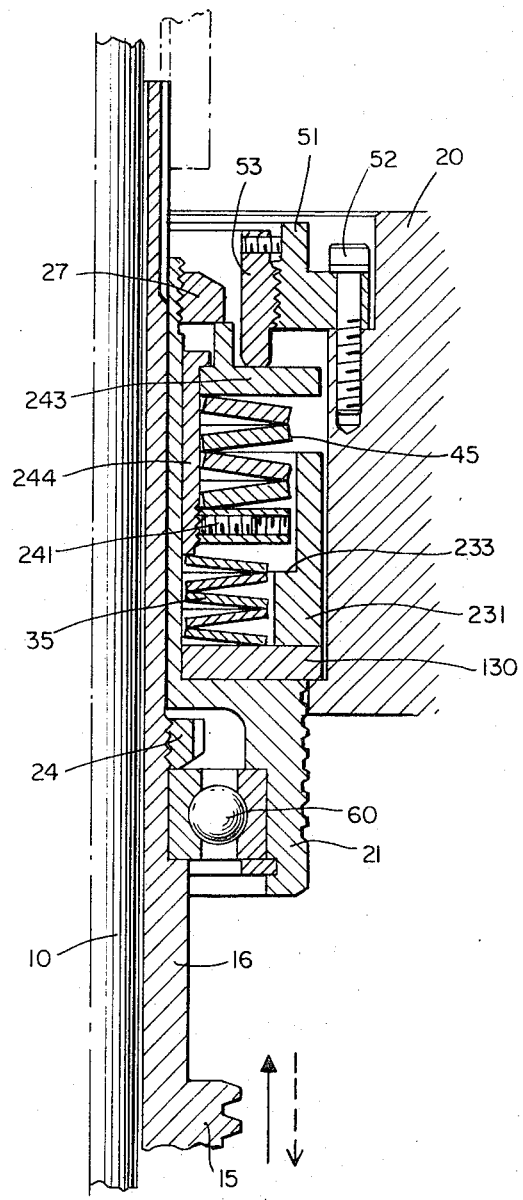
FIG. 3 is a view, in section, of still another form of restraining mechanism according to the present invention.
Figure 5:
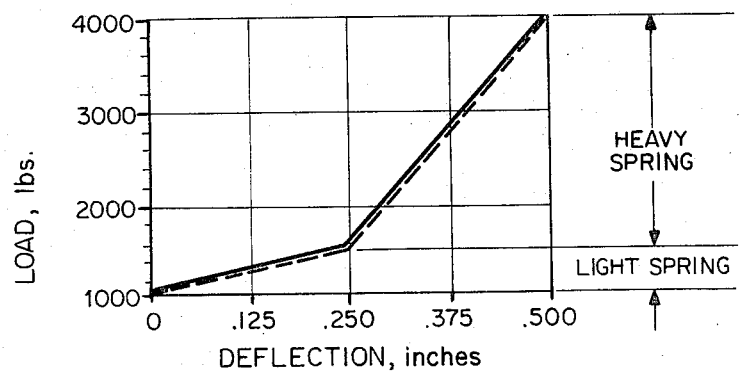
FIG. 5 is a set of curves illustrating the relationship between axial load and deflection of the restraining means, and is applicable to the mechanism of FIG. 2.
Figure 6:
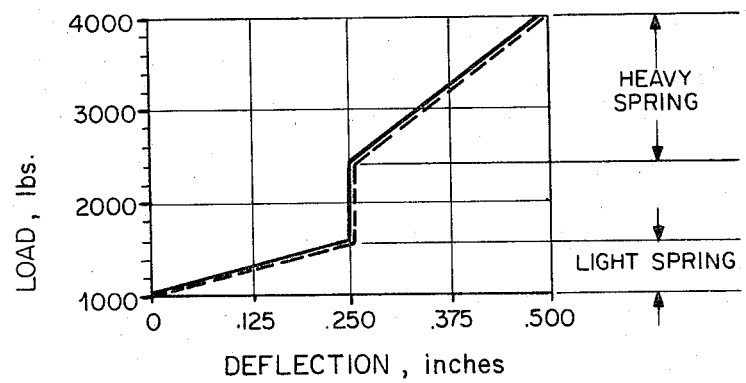
FIG. 6 is a set of curves illustrating the relationship between axial load and deflection of the restraining

FIGS. 2 and 3 illustrate two modifications embodying the present invention. The illustrations in FIGS. 2 and 3 differ from that in FIG. 1 in that FIG. 1 shows a full section of the restraining structure on both sides of the center axis of the worm drive shaft 10. The restraining structure on one side of the center axis is, however, identical to that on the other. Thus, it is deemed sufficient, in FIGS. 2 and 3, to merely show the structure lying to one side of the center axis of the drive shaft. Accordingly, FIG. 2 shows the structure of one modified embodiment as seen on one side of the center axis of the drive shaft, and FIG. 3 shows the structure of a different modified embodiment as seen on the other side of the center axis of the drive shaft. FIGS. 5 and 6 show, respectively, the load v. deflection curves from the structures of FIGS. 2 and 3.

Referring now to FIG. 2, in the restraining mechanism there shown, a set of light springs 35 is effective in both directions of axial thrust of the worm 15. This is illustrated graphically in FIG. 5 where the solid line shows graphically the deflections of the set of light springs and the set of heavy springs when the axial thrust is in the direction of the solid-line arrow in FIG. 2 and the dashed-line in FIG. 5 shows graphically the deflections of the set of light springs and the set of heavy springs when the axial thrust is in the direction indicated by the dashed-line-arrow in FIG. 2.

Considering first the condition wherein the worm drive shaft 10 is being rotated clockwise, as viewed from the bottom of FIG. 2, and wherein the torque load on the output shaft, such as shaft 19 in FIG. 1, creates a thrust load axially on worm 15 in the direction indicated by the solid-line arrow. This thrust is transmitted through the bearing assembly 60 to the cartridge 21 and then to the retainer 130 of the set of light springs 35. When, in the example being described, the thrust load exceeds 1,000 lbs., deflection occurs as indicated in FIG. 5. When the thrust load reaches 1,500 lbs., a deflection of one-quarter-inch (0.250 inch) has taken place on the dished washers of the set of light springs 35, and the end of the annular stop member 131 has now reached and is in abutment against the surface of the retainer 141 of the set of heavy springs 45. Thereafter, as the thrust load on the worm 15 increases beyond 1,500 lbs., the thrust is applied through the stop member 131 and retainer 141 to the set of heavy springs 45, and the heavy springs deflect. When the thrust load reaches 4,000 lbs., a deflection of one-quarter-inch (0.250 inch) has taken place in the dished washers of the set of heavy springs 45. Under this condition, the end of the annular stop 142 has reached and abuted against retainer 143, and further axial movement is prevented.

When the direction of rotation of the worm drive shaft 10 is in the opposite direction, setting up an axial thrust on worm 15 in the direction indicated by the dashed-line arrow in FIG. 2, the axial thrust on the worm 15 is transmitted through nut 24, bearing assembly 60, retainer 23 and cartridge 21 to the nut 27 at upper end of sleeve portion 26 of the cartridge 21 and thence to the retainer 143 of the set of heavy springs 45. This thrust is then transmitted through the set of heavy springs 45, which do not yet deflect, to the retainer 141 and thence to the set of light springs 35. No deflection of either set of dished washers 35 or 45 takes place until the thrust load equals 1,000 lbs., at which time the set of dished washers forming the light spring 35 begins to deflect. This deflection continues as the thrust increases from 1,000 to 1,500 lbs. At that time, a deflection of one-quarter-inch (0.250 inch) has taken place in the set of light springs 35 and the surface of the retainer 141 has now abuted against the end surface of the annular stop 131. Thereafter, as the thrust load increases beyond 1,500 lbs., deflection of the set of heavy springs 45 takes place, until the retainer 143 reaches and abuts against the end of annular stop 142.

The restraining mechanism shown in FIG. 3 is similar, in many respects, to that shown in FIG. 2 and it will suffice to describe briefly the structure of FIG. 3. When an axial thrust on worm 15 occurs in the direction indicated by the solid-line arrow in FIG. 3, the thrust is transmitted through the bearing assembly 60 to the cartridge 21 and to the retainer 130 of the set of light springs 35. When, in the example being described, the thrust exceeds 1,000 lbs., deflection of the set of light springs takes place which continues until the thrust reaches 1,500 lbs., at which time a deflection of one-quarter-inch (0.250 inch) has taken place. This is illustrated graphically in FIG. 6. At this time, shoulder 233 on stop member 231 has reached and abuted against the surface of retainer 241 of the set of heavy springs 45. Thereafter, as depicted graphically in FIG. 6, when the thrust load increases from 1,500 to 2,500 lbs., no deflection of the set of heavy springs occurs until the thrust exceeds 2,500 lbs., at which time the dished washers of the set of heavy springs 45 begin to deflect. This deflection continues, as the thrust increases from 2,500 to 4,000 lbs. At that time, a deflection of one-quarter inch has taken place in the set of heavy springs 45 and the end of the annular stop 231 has now reached the surface of the retainer 243. This prevents further deflection of the set of heavy springs 45.

A significant difference between the restraining structures of FIGS. 2 and 3 resides in the manner in which adjustment is made to the pre-load conditions of the sets of restraining springs. In the restraining mechanism of FIG. 2, pre-loading both sets of springs is achieved by means of nut 27 and the stop nut 53, and one set cannot be adjusted independently of the other. In the structure of FIG. 3, adjustment of the set of heavy springs 45 may be made independently of the set of light springs 35. Adjustment of the light springs is made by the nut 27, retainer 243, stop nut 53, and the retainer 241. Retainer 241 is adjustable on a sleeve 244 to adjust the pre-load condition of the heavy springs 45 independently of the light springs 35. A set screw holds retainer 241 against movement after the desired preload condition has been set.

What is claimed is:

1. In a worm and worm gear mechanism in which the worm is subjected to axial thrust forces in either of two linear directions according to torque forces developed on said worm gear in corresponding rotational directions, said mechanism characterized by the provision of:
   a. first pre-loaded compression spring restraining means for allowing axial displacement of said worm in one or the other of said linear directions when the thrust forces on said worm, resulting from torque forces on said worm gear in a corresponding rotational direction, exceed a first pre-selected relatively low value;
   b. second pre-loaded compression spring restraining means for allowing further axial displacement of said worm in the same linear direction when the thrust forces on said worm resulting from torque forces on said worm gear in said same corresponding rotational direction, exceed a second preselected relative higher value.

2. A mechanism according to claim 1 wherein:
   a. said first restraining means comprises a set of dished spring washers retained between a first pair of retaining members;
   b. said second restraining means comprises a second set of heavier dished spring washers retained between a second pair of retaining members.

3. A mechanism according to claim 1 wherein adjustment means are provided for adjusting the pre-load conditions of said first and second restraining means.

4. A mechanism according to claim 3 wherein separate adjustment means are provided for adjusting separately the pre-load conditions of said first and second restraining means.

5. A mechanism according to claim 1 wherein there is provided:
a. a rotatable switch shaft;
b. means coupling said worm to said switch shaft such that axial movement of said worm effects rotational movement of said switch shaft.

6. A mechanism according to claim 1 wherein:
a. first stop means are provided for preventing deflection of said first restraining means beyond a first pre-selected axial distance in either of said linear directions;
b. second stop means are provided for preventing deflection of said second restraining means beyond a second pre-selected axial distance in either of said linear directions.

7. A mechanism according to claim 6 wherein:
a. said first restraining means comprises a set of dished spring washers retained between a first pair of retaining members;
b. said second restraining means comprises a second set of heavier dished spring washers retained between a second pair of retaining members.

8. A mechanism according to claim 7 wherein one of said members of said first and second pairs of retaining members is common.

* * * * *